United States Patent
Lynch

(10) Patent No.: US 8,306,920 B1
(45) Date of Patent: Nov. 6, 2012

(54) METHOD AND SYSTEM TO SECURELY STORE CUSTOMER DATA IN A NETWORK-BASED COMMERCE SYSTEM

(75) Inventor: Liam Sean Lynch, San Jose, CA (US)

(73) Assignee: eBay Inc., San Jose, CA (US)

( * ) Notice: Subject to any disclaimer, the term of this patent is extended or adjusted under 35 U.S.C. 154(b) by 1969 days.

(21) Appl. No.: 10/902,647

(22) Filed: Jul. 28, 2004

(51) Int. Cl.
*G06Q 20/00* (2012.01)
(52) U.S. Cl. .............. 705/71; 705/50; 705/51; 705/64
(58) Field of Classification Search .............. 705/50, 705/51, 64, 71
See application file for complete search history.

(56) References Cited

U.S. PATENT DOCUMENTS 6,041,123 A * 3/2000 Colvin, Sr. ............... 713/153
2004/0250085 A1 * 12/2004 Tattan et al. .............. 713/186
* cited by examiner

*Primary Examiner* — Pierre E Elisca
(74) *Attorney, Agent, or Firm* — Schwegman Lundberg & Woessner, P.A.

(57) ABSTRACT

A system and method for securely storing sensitive customer data in a network-based commerce system such that encryption keys are not exposed to the system is described. Sensitive customer data is received via a network connection through an application interface. A symmetric key is generated, and the sensitive customer data is encoded with the symmetric key. The symmetric key is encoded with an asymmetric key and the encoded sensitive customer data and the encoded symmetric key are placed in a self-describing data-structure. The encoded sensitive customer data and the encoded symmetric key are stored in a database.

26 Claims, 10 Drawing Sheets

METHOD AND SYSTEM TO SECURELY STORE CUSTOMER DATA IN A NETWORK-BASED COMMERCE SYSTEM

FIELD OF THE INVENTION

Exemplary embodiments of present invention relate generally to the technical field of network-based commerce and, in one exemplary embodiment, to methods and systems to securely store customer data in a network-based commerce system.

BACKGROUND OF THE INVENTION

Sensitive customer data can be stored in a database, which encrypts the sensitive data at the database level. When encryption is done at the database level, a hardware encryption solution is embedded in the machine where the database runs, or, a software package such as PROTEGRITY is embedded in the database. Keys for encryption and decryption are managed and maintained at the database. However, traditional solutions such as hardware encryption and PROTEGRITY make migrating encrypted data from one database machine to another quite difficult, if not impossible, because decryption keys are often lost when migration is attempted. Additionally, traditional solutions are unwieldy for database administrators who do not specialize in or design their systems with encryption in mind. Furthermore, from a security standpoint, it is not advantageous to store the encryption key required to decrypt the data in the same location as the encrypted data.

Network-based commerce systems would benefit from an encryption solution with at least two levels of encryption, so that the system has defense-in-depth of encryption. Furthermore if an encryption solution is standards-based, the encrypted data could be easily migrated between machines and systems without the danger of exposing the encrypted data or losing the decryption keys.

SUMMARY OF INVENTION

A system for securely storing sensitive customer data such that encryption keys are not exposed to the system. A sensitive customer data application has an application interface to accept sensitive customer data, and is connected to a symmetric key generator, which generates a symmetric key. A data encryptor encrypts the sensitive customer data with the symmetric key to form encrypted sensitive customer data. A key encryptor encrypts the symmetric key with a public key to form an encrypted symmetric key. A secure container module stores the encrypted sensitive customer data and the encrypted symmetric key in a self-describing data structure.

DETAILED DESCRIPTION OF THE DRAWINGS

The invention is now described, by way of example, with reference to the accompanying diagrammatic drawings in which the same reference numerals indicate the same or similar features, unless otherwise indicated.

Figure 4:
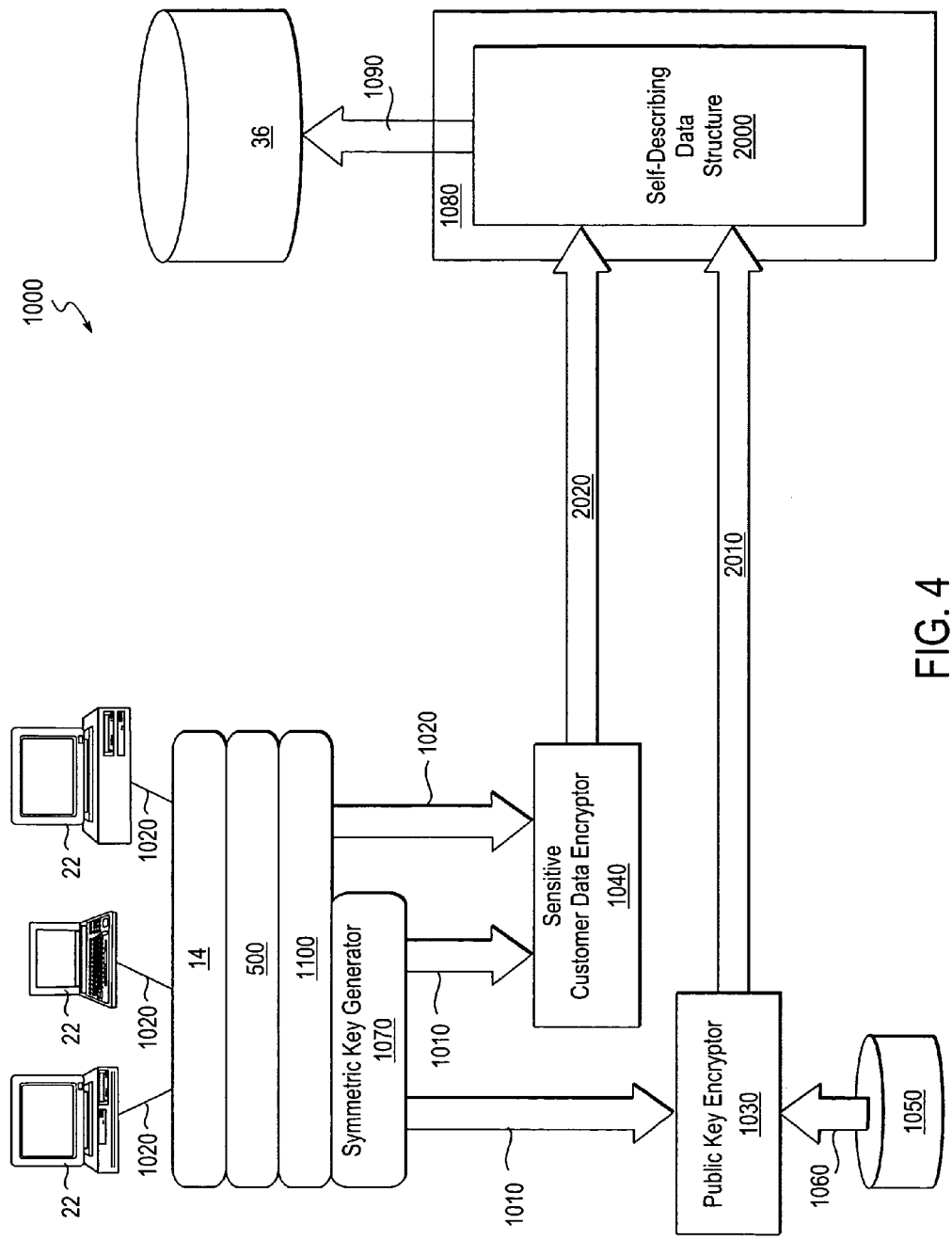

FIG. 4 provides a data flow diagram representing the flow of data in one embodiment of the system described with reference to FIG. 1.

Figure 5:
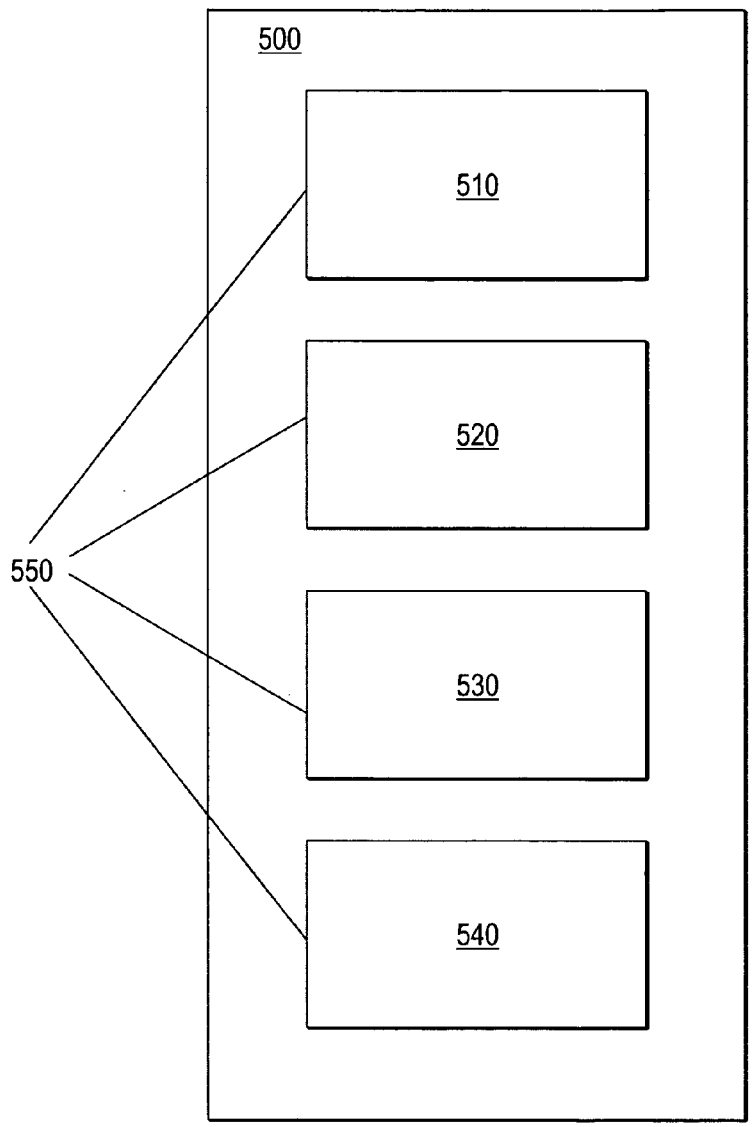

FIG. 5 provides a diagrammatic view of one embodiment of the sensitive customer data application interface through which sensitive customer data is received by the sensitive customer data application.

Figure 6:
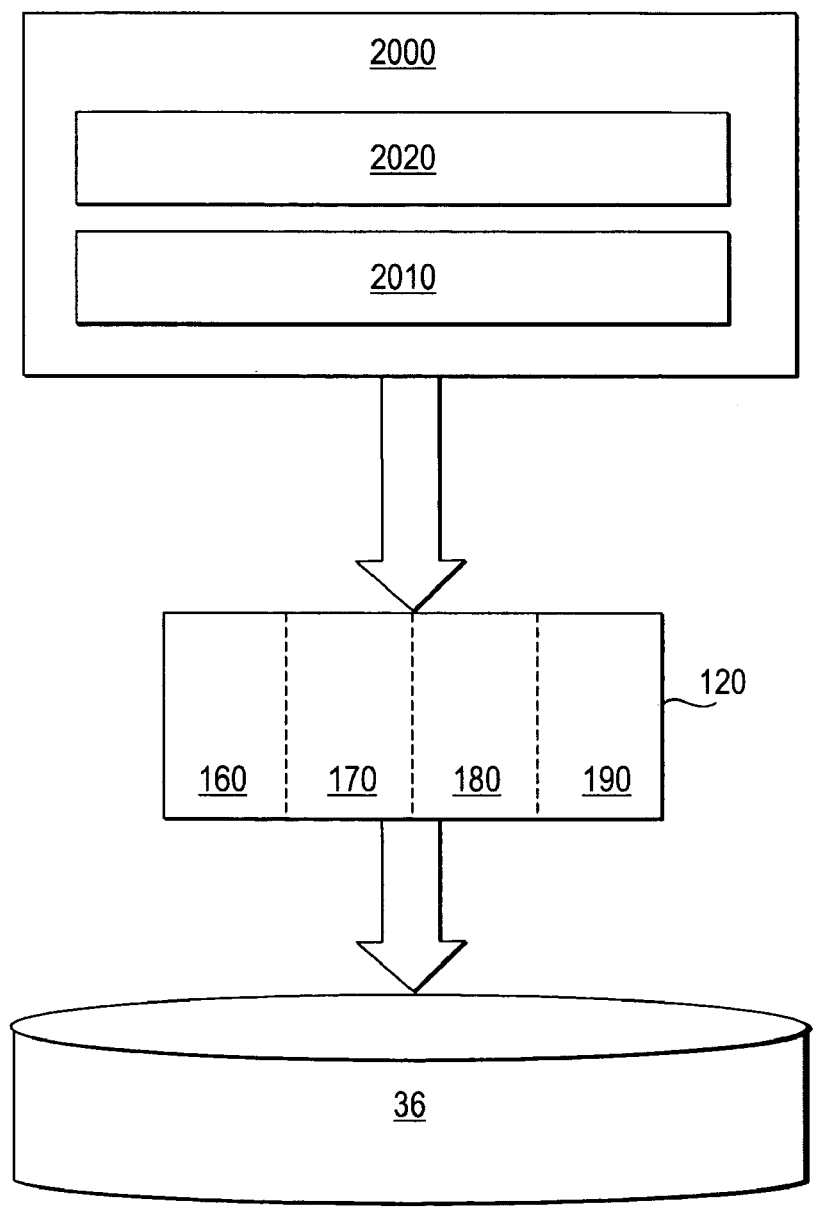

FIG. 6 provides a diagrammatic representation of one embodiment of the flow of data from the self-describing data structure to the database, which is blind to the sensitive customer data.

Figure 7:
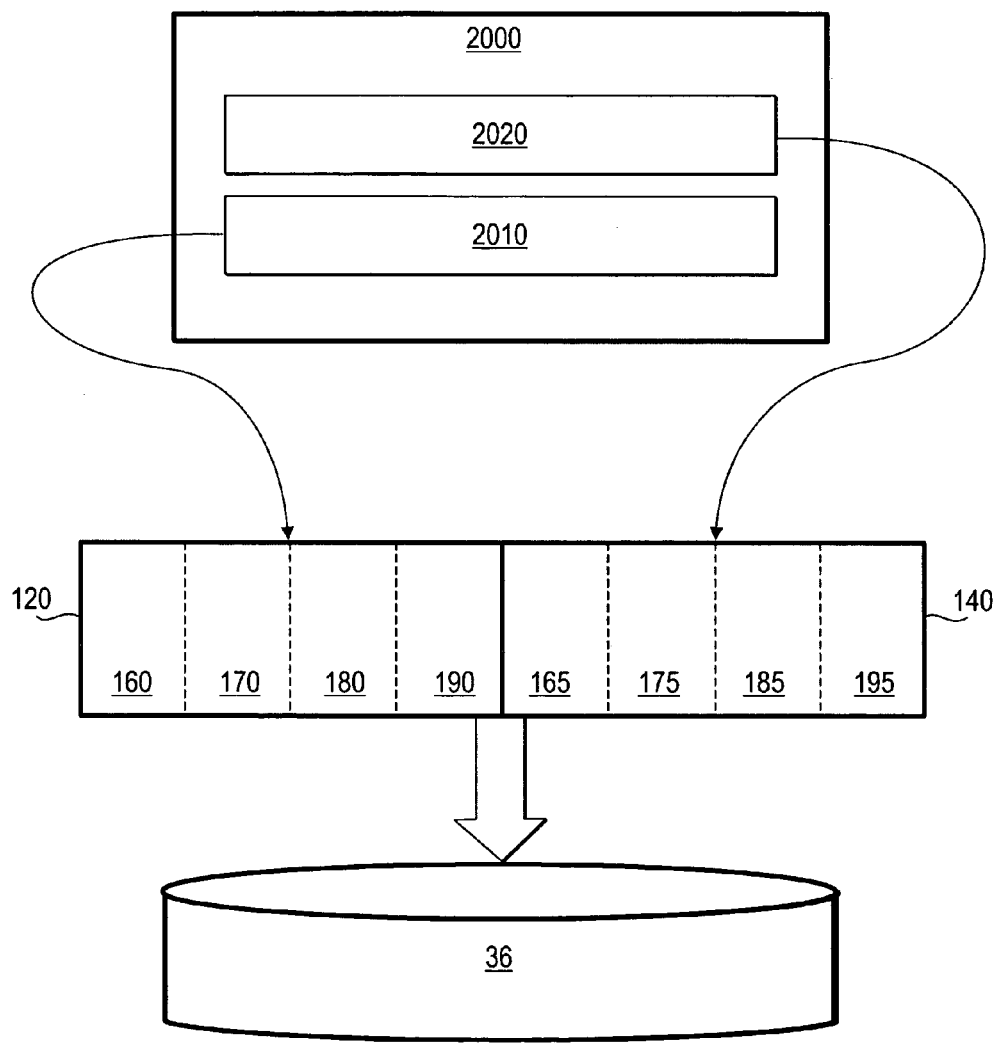

FIG. 7 provides a diagrammatic representation of another embodiment of the flow of data from the self-describing data structure to the database, which is blind to the sensitive customer data.

Figure 8:
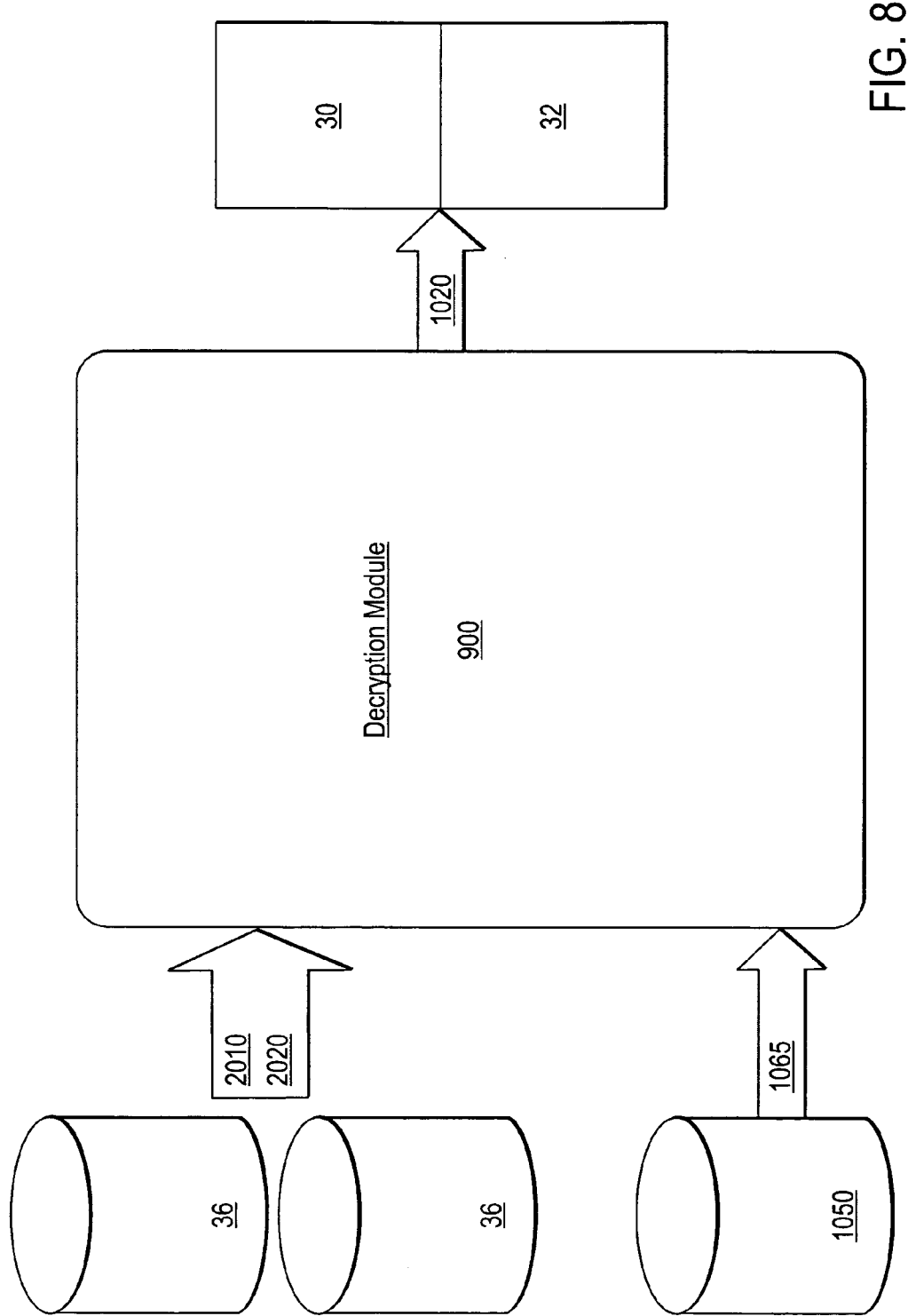

FIG. 8 provides a diagrammatic representation of one embodiment of the flow, of data from the database to the applications, which require the un-encrypted sensitive customer data.

Figure 9:
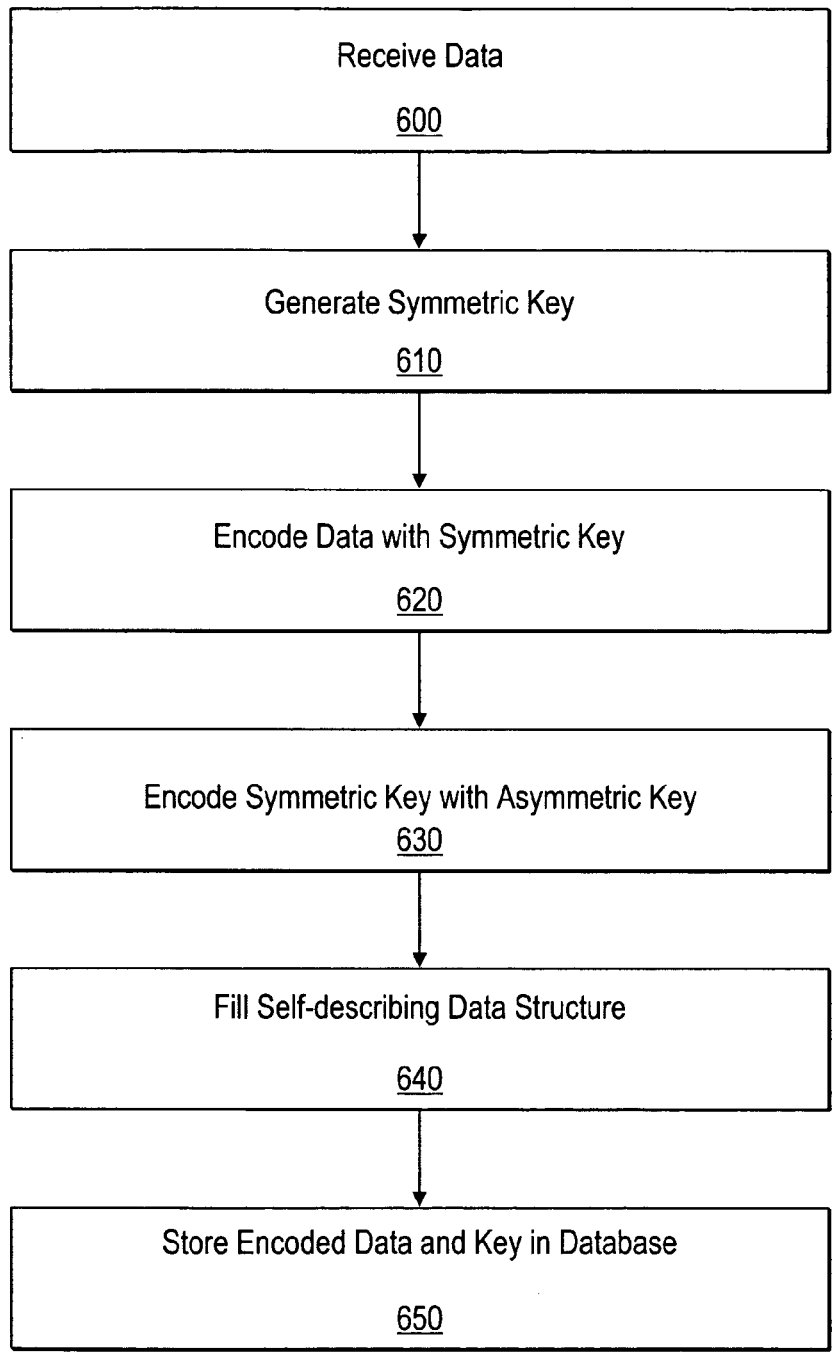

FIG. 9 provides a flow chart view of one embodiment of the method to securely store customer data in a network-based commerce system.

Figure 10:
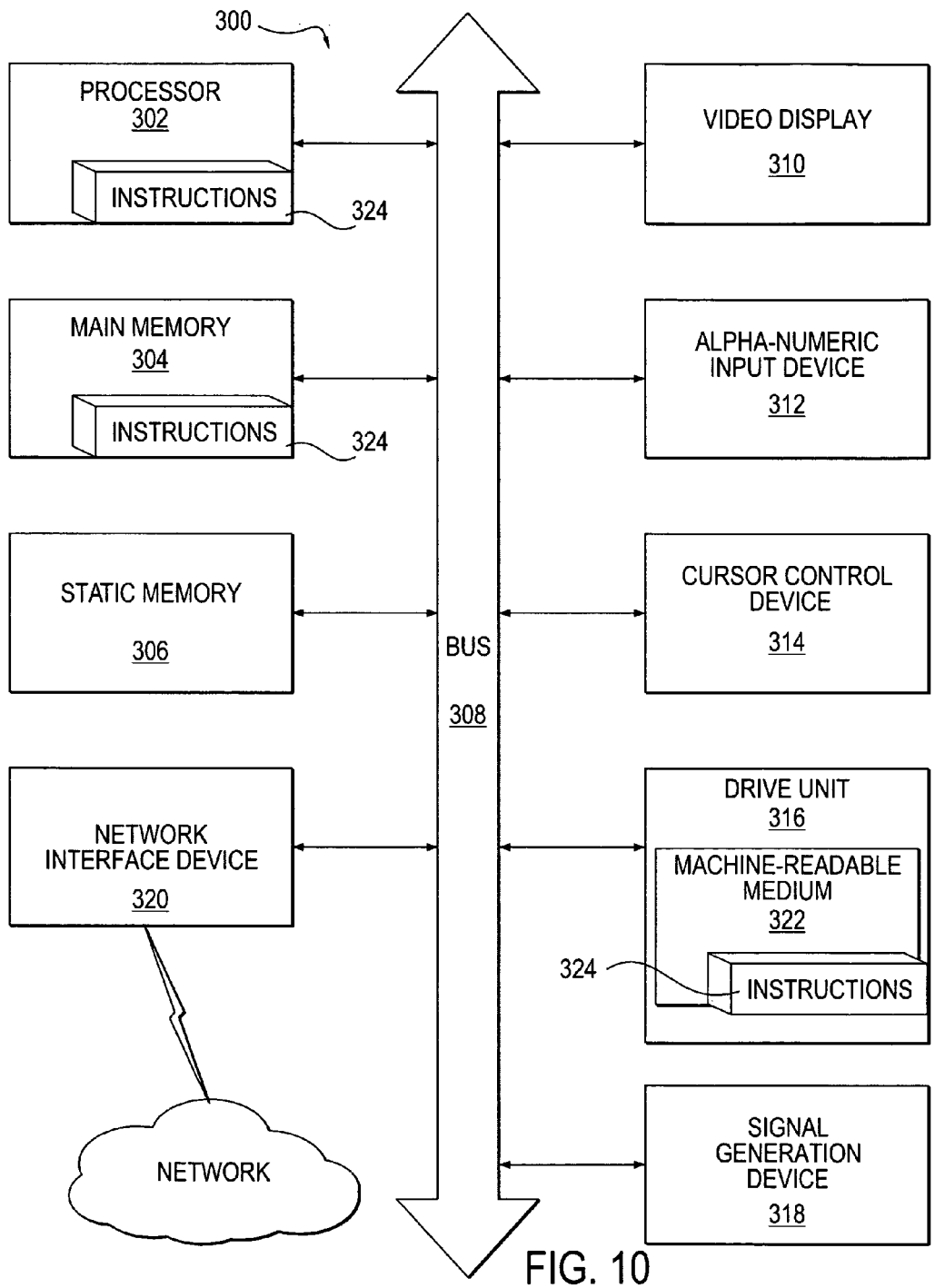

FIG. 10 shows a diagrammatic representation of machine in the exemplary form of a computer system within which a set of instructions, for causing the machine to perform any one or more of the methodologies discussed herein, may be executed.

DETAILED DESCRIPTION

A method and system to securely store customer data in a network-based commerce system are described. In the following description, for purposes of explanation, numerous specific details are set forth in order to provide a thorough understanding of the present invention. It will be evident, however, to one skilled in the art that the present invention may be practiced without these specific details.

Platform Architecture

Figure 1:
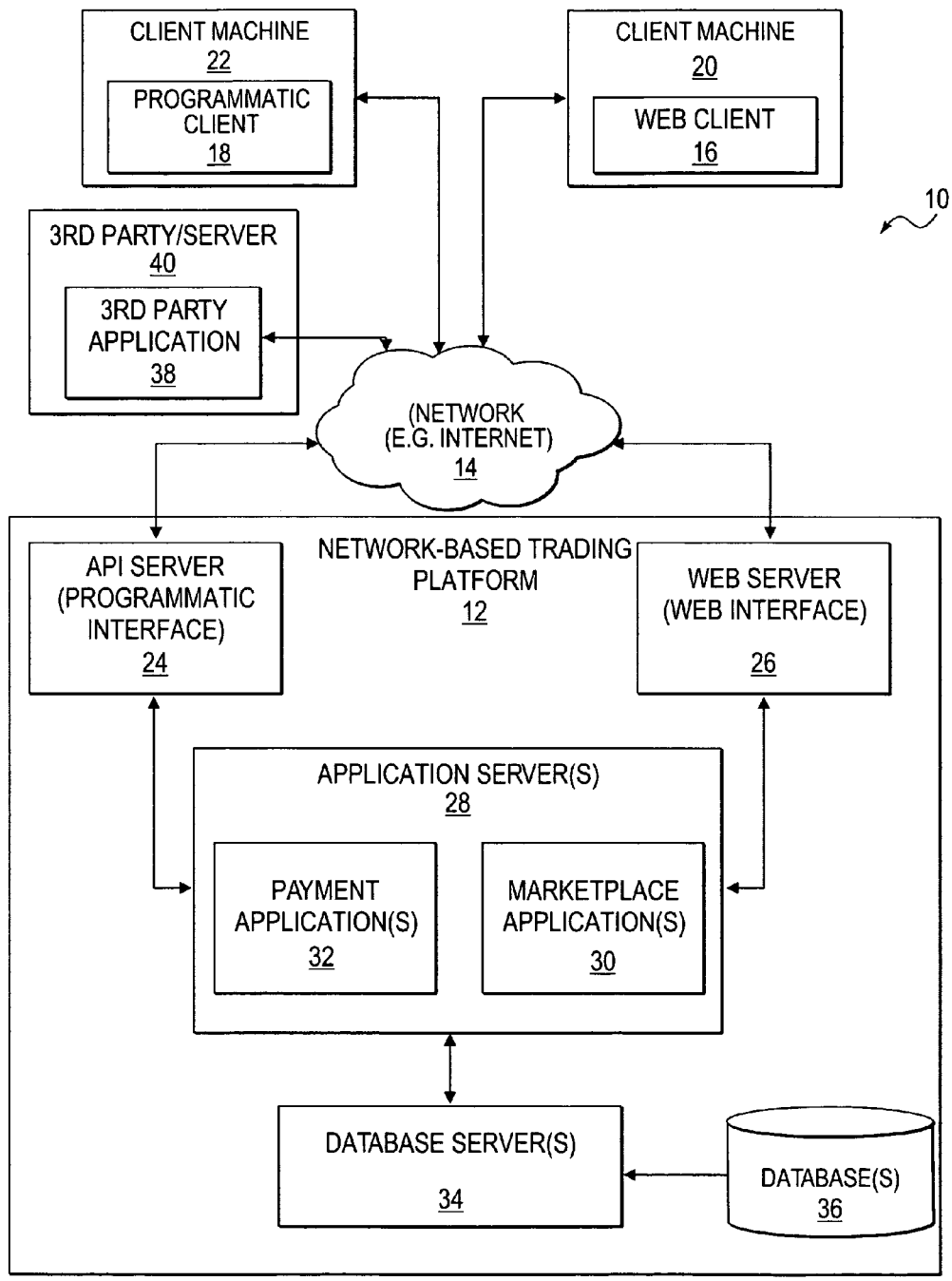
FIG. 1 is a network diagram depicting a system, according to one exemplary embodiment of the present invention, having a client-server architecture.

FIG. 1 is a network diagram depicting a system 10, according to one exemplary embodiment of the present invention, having a client-server architecture. A commerce platform, in the exemplary form of a network-based marketplace 12, provides server-side functionality, via a network connection 14, for example, a HyperText Transfer Protocol (HTTP) connection, or a secure HTTP connection (HTTPS) over the Internet to one or more clients. FIG. 1 illustrates, for example, a web client 16 (e.g., a browser, such as the Internet Explorer browser developed by Microsoft Corporation of Redmond, Wash. State), and a programmatic client 18 executing on respective client machines 20 and 22.

Turning specifically to the network-based marketplace 12, an Application Program Interface (API) server 24 and a web server 26 are coupled to, and provide programmatic and web interfaces respectively to, one or more application servers 28. The application servers 28 host one or more marketplace applications 30 and payment applications 32. The application servers 28 are, in turn, shown to be coupled to one or more databases servers 34 that facilitate access to one or more databases 36.

The marketplace applications 30 provide a number of marketplace functions and services to users that access the marketplace 12. The payment applications 32 likewise provide a number of payment services and functions to users. The payment applications 30 may allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the marketplace applications 30. While the marketplace and payment applications 30 and 32 are shown in FIG. 1 to both form part of the network-based marketplace 12, it will be appreciated that, in alternative embodiments of the present invention, the payment applications 32 may form part of a payment service that is separate and distinct from the marketplace 12.

Further, while the system 10 shown in FIG. 1 employs a client-server architecture, the present invention is of course not limited to such an architecture, and could equally well find application in a distributed, or peer-to-peer, architecture system. The various marketplace and payment applications 30 and 32 could also be implemented as standalone software programs, which do not necessarily have networking capabilities.

The web client 16, it will be appreciated, accesses the various marketplace and payment applications 30 and 32 via the web interface supported by the web server 26. Similarly, the programmatic client 18 accesses the various services and functions provided by the marketplace and payment applications 30 and 32 via the programmatic interface provided by the API server 24. The programmatic client 18 may, for example, be a seller application (e.g., the TURBOLISTER application developed by eBay Inc., of San Jose, Calif.) to enable sellers to author and manage listings on the marketplace 12 in an off-line manner, and to perform batch-mode communications between the programmatic client 18 and the network-based marketplace 12.

FIG. 1 also illustrates a third party application 38, executing on a third party server machine 40, as having programmatic access to the network-based marketplace 12 via the programmatic interface provided by the API server 24. For example, the third party application 38 may, utilizing information retrieved from the network-based marketplace 12, support one or more features or functions on a website hosted by the third party. The third party website may, for example, provide one or more promotional, marketplace or payment functions that are supported by the relevant applications of the network-based marketplace 12.

Marketplace Applications

Figure 2:
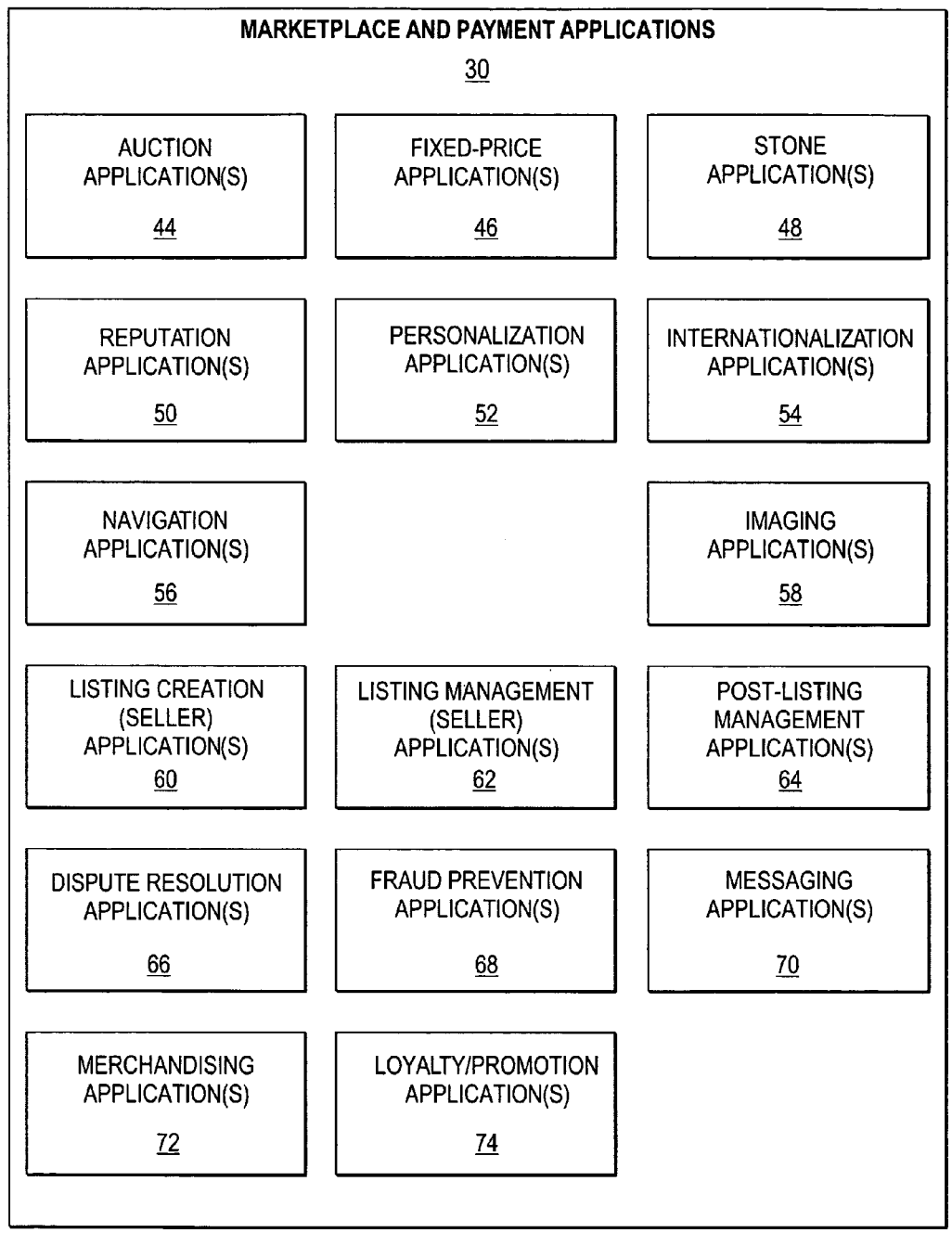
FIG. 2 is a block diagram illustrating multiple marketplace and payment applications that, in one exemplary embodiment of the present invention, are provided as part of the network-based marketplace.

FIG. 2 is a block diagram illustrating multiple marketplace and payment applications 30 that, in one exemplary embodiment of the present invention, are provided as part of the network-based marketplace 12. The marketplace 12 may provide a number of listing and price-setting mechanisms whereby a seller may list goods or services for sale, a buyer can express interest in or indicate a desire to purchase such goods or services, and a price can be set for a transaction pertaining to the goods or services. To this end, the marketplace applications 30 are shown to include one or more auction applications 44 which support auction-format listing and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 46 support fixed-price listing formats (e.g., the traditional classified advertisement-type listing or a catalogue listing) and buyout-type listings. Specifically, buyout-type listings (e.g., including the BUY-IT-NOW (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 48 allow sellers to group their listings within a "virtual" store, which may be branded and otherwise personalized by and for the sellers. Such a virtual store may also offer promotions, incentives and features that are specific and personalized to a relevant seller.

Reputation applications 50 allow parties that transact utilizing the network-based marketplace 12 to establish, build and maintain reputations, which may be made available and published to potential trading partners. Consider that where, for example, the network-based marketplace 12 supports person-to-person trading, users may have no history or other reference information whereby the trustworthiness and credibility of potential trading partners may be assessed. The reputation applications 50 allow a user, for example through feedback provided by other transaction partners, to establish a reputation within the network-based marketplace 12 over time. Other potential trading partners may then reference such a reputation for the purposes of assessing credibility and trustworthiness.

Personalization applications 52 allow users of the marketplace 12 to personalize various aspects of their interactions with the marketplace 12. For example a user may, utilizing an appropriate personalization application 52, create a personalized reference page at which information regarding transactions to which the user is (or has been) a party may be viewed. Further, a personalization application 52 may enable a user to personalize listings and other aspects of their interactions with the marketplace 12 and other parties.

In one embodiment, the network-based marketplace 12 may support a number of marketplaces that are customized, for example, for specific geographic regions. A version of the marketplace 12 may be customized for the United Kingdom, whereas another version of the marketplace 12 may be customized for the United States. Each of these versions may operate as an independent marketplace, or may be customized (or internationalized) presentations of a common underlying marketplace. Navigation of the network based-marketplace 12 may be facilitated by one or more navigation applications 56. For example, a search application enables key word searches of listings published via the marketplace 12. A browse application allows users to browse various category, catalogue, or inventory data structures according to which listings may be classified within the marketplace 12. Various other navigation applications may be provided to supplement the search and browsing applications.

In order to make listings, available via the network-based marketplace 12, as visually informing and attractive as possible, the marketplace applications 30 may include one or more imaging applications 58 utilizing which users may upload images for inclusion within listings. An imaging application 58 also operates to incorporate images within viewed listings. The imaging applications 58 may also support one or more promotional features, such as image galleries that are presented to potential buyers. For example, sellers may pay an additional fee to have an image included within a gallery of images for promoted items.

Listing creation applications 60 allow sellers conveniently to author listings pertaining to goods or services that they wish to transact via the marketplace 12, and listing management applications 62 allow sellers to manage such listings. Specifically, where a particular seller has authored and/or published a large number of listings, the management of such listings may present a challenge. The listing management applications 62 provide a number of features (e.g., auto-relisting, inventory level monitors, etc.) to assist the seller in managing such listings. One or more post-listing management applications 64 also assist sellers with a number of activities that typically occur post-listing. For example, upon completion of an auction facilitated by one or more auction applications 44, a seller may wish to leave feedback regarding a particular buyer. To this end, a post-listing management application 64 may provide an interface to one or more reputation applications 50, so as to allow the seller conveniently to provide feedback regarding multiple buyers to the reputation applications 50.

Dispute resolution applications 66 provide mechanisms whereby disputes arising between transacting parties may be resolved. For example, the dispute resolution applications 66 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 68 implement various fraud detection and prevention mechanisms to reduce the occurrence of fraud within the marketplace 12.

Messaging applications 70 are responsible for the generation and delivery of messages to users of the network-based marketplace 12, such messages for example advising users regarding the status of listings at the marketplace 12 (e.g., providing "outbid" notices to bidders during an auction process or to provide promotional and merchandising information to users).

Merchandising applications 72 support various merchandising functions that are made available to sellers to enable sellers to increase sales via the marketplace 12. The merchandising applications 80 also operate the various merchandising features that may be invoked by sellers, and may monitor and track the success of merchandising strategies employed by sellers.

The network-based marketplace 12 itself, or one or more parties that transact via the marketplace 12, may operate loyalty programs that are supported by one or more loyalty/promotions applications 74. For example, a buyer may earn loyalty or promotions points for each transaction established and/or concluded with a particular seller, and be offered a reward for which accumulated loyalty points can be redeemed.

Data Structures

Figure 3:
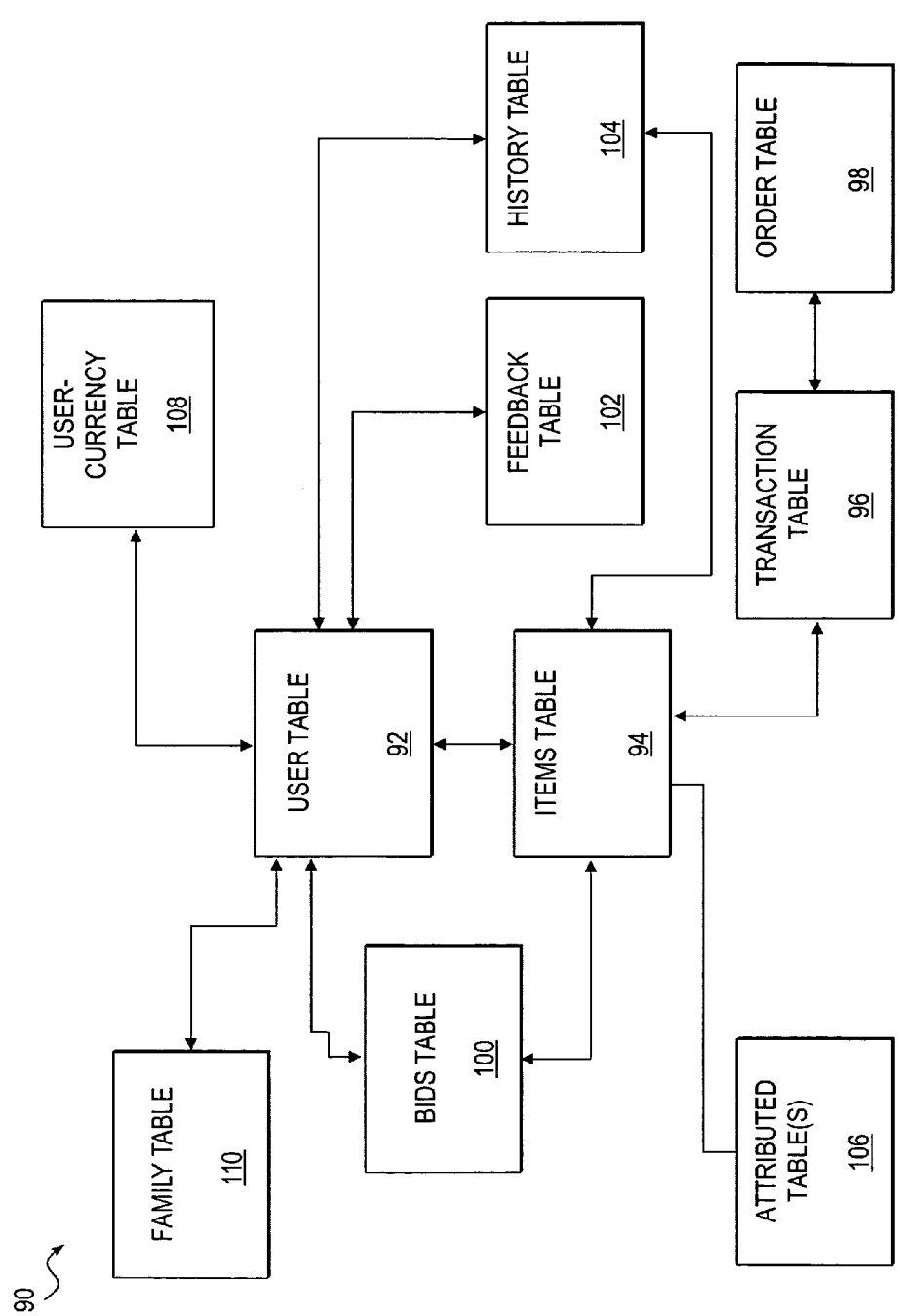
FIG. 3 is a high-level entity-relationship diagram, illustrating various tables that may be maintained within the databases, and that are utilized by and support the marketplace and payment applications.

FIG. 3 is a high-level entity-relationship diagram, illustrating various tables 90 that may be maintained within the databases 36, and that are utilized by and support the marketplace and payment applications 30 and 32. A user table 92 contains a record for each registered user of the network-based marketplace 12, and may include identifier, address and financial instrument information pertaining to each such registered user. A user may, it will be appreciated, operate as a seller, a buyer, or both, within the network-based marketplace 12. In one exemplary embodiment of the present invention, a buyer may be a user that has accumulated value (e.g., commercial or proprietary currency), and is then able to exchange the accumulated value for items that are offered for sale by the network-based marketplace 12.

The tables 90 also include an items table 94 in which are maintained item records for goods and services that are available to be, or have been, transacted via the marketplace 12. Each item record within the items table 94 may furthermore be linked to one or more user records within the user table 92, so as to associate a seller and one or more actual or potential buyers with each item record.

A transaction table 96 contains a record for each transaction (e.g., a purchase transaction) pertaining to items for which records exist within the items table 94.

An order table 98 is populated with order records, each order record being associated with an order. Each order, in turn, may be with respect to one or more transactions for which records exist within the transactions table 96. Bid records within a bids table 100 each relate to a bid received at the network-based marketplace 12 in connection with an auction-format listing supported by an auction application 44. A feedback table 102 is utilized by one or more reputation applications 50, in one exemplary embodiment, to construct and maintain reputation information concerning users. A history table 104 maintains a history of transactions to which a user has been a party. One or more attributes tables 106 record attribute information pertaining to items for which records exist within the items table 94. Considering only a single example of such an attribute, the attributes tables 106 may indicate a currency attribute associated with a particular item, the currency attribute identifying the currency of a price for the relevant item as specified in by a seller.

Data Flow

FIG. 4 provides a data flow diagram representing the flow of data in one embodiment of the system 1000 of the present invention. Sensitive customer data 1020 is received from clients 22 by a sensitive customer data application 1100. The sensitive customer data application 1100 can be one of the marketplace applications 30 or payment applications 32. The sensitive customer data application 1100 interacts with clients 22 over the network 14 via a sensitive customer data application interface 500. The sensitive customer data application 1100 connects with a symmetric key generator 1070, which generates a symmetric key 1010 for the sensitive customer data 1020 being stored. Exemplary algorithms for generating symmetric keys and encrypting with them include the Data Encryption Standard (DES), Advanced Encryption Standard (AES), and several re-incarnations of DES, including triple-DES with Cipher Block Chaining (CBC).

A public key encryptor 1030 receives the symmetric key 1010 generated by the symmetric key generator 1070. The public key encryptor 1030 is capable of encrypting the public key 1060 of an asymmetric key pair. Asymmetric key pairs include a public key 1060 and a private key, and are used in asymmetric encryption algorithms that are well known in the art, including standards such as RSA, Digital Signature Standard (DSS), and Pretty Good Privacy (PGP). The public key encryptor 1030 also receives (or has access to) the public key 1060, which may be stored in a protected device such as a keystore 1050. The public key encryptor 1030 uses the asymmetric public key 1060 to encode the symmetric key 1010 as an asymmetric key encrypted symmetric key 2010.

A sensitive customer data encryptor 1040 is also shown to receive the symmetric key 1010. Additionally, the sensitive customer data encryptor 1040 receives sensitive customer data 1020. The sensitive customer data encryptor 1040 uses the symmetric key 1010 to encode the sensitive customer data 1020 as encrypted sensitive customer data 2020.

A secure container module 1080 places the encrypted sensitive data 2020 and the asymmetric key encrypted symmetric key 2010 in a self-describing data structure 2000. In one embodiment, the self-describing data structure 2000 is a well-formed XML document. In another embodiment, the self-describing data structure 2000 comprises snippets of XML that are not well-formed.

After being placed in the self-describing data structure 2000, the encrypted sensitive customer data 2020 and the asymmetric key encrypted symmetric key 2010 are stored 1090 in one or more databases 36, which are blind to the sensitive customer data 1020.

FIG. 5 provides a diagrammatic view of an exemplary embodiment of the sensitive customer data application interface 500 through which sensitive customer data 1020 is received by the sensitive customer data application 1100. The sensitive customer data application interface 500 contains several method calls 550, which it can utilize to set sensitive customer data values in the system 1000. Example method calls 550 which may be useful in the system 1000 include Set_CC 510, Set_NI 520, Set_DD 530, and other method calls 540.

The Set_CC method call 510 is utilized by the sensitive customer data application 1100 in order to safely and correctly accept and handle sensitive customer data 1020 in the form of credit card billing information. The Set_NI method call 520 is used by the sensitive customer data application 1100 in order to safely and correctly handle sensitive customer data 1020 in the form of national identification information. The Set_DD method call 530 is used by the sensitive customer data application 1100 in order to safely and correctly handle sensitive customer data 1020 in the form of direct debit information. Other method calls 540 can be used to handle sensitive customer data 1020 in other forms as is necessary.

In one embodiment of the self-describing data structure 2000, an XML document is formed which contains several elements including AccountNumber, Encrypted Data, EncryptionMethod, KeyInfo, EncryptedKey, CipherData. These elements are all defined in the XML ENC standard, which makes this particular embodiment of the self-describing container standards compliant.

The text of an exemplary self-describing data structure 2000, in the form of an XML document that follows the XML ENC standard follows:

```
1   <?xml version="1.0" encoding="utf-8"?>
2   <AccountNumber>
3     <EncryptedData Type="http://www.w3.org/2001/04/
xmlenc#Content" xmlns="http://www.w3.org/2001/04/xmlenc#">
4       <EncryptionMethod
Algorithm="http://www.w3.org/2001/04/xmlenc#tripledes-cbc"/>
5       <KeyInfo xmlns="http://www.w3.org/2000/09/xmldsig#">
6         <EncryptedKey
xmlns="http://www.w3.org/2001/04/xmlenc#">
7           <EncryptionMethod
Algorithm="http://www.w3.org/2001/04/xmlenc#rsa-1_5"/>
8           <KeyInfo
xmlns="http://www.w3.org/2000/09/xmldsig#">
9             <KeyName>1024bit_rsa</KeyName>
10          </KeyInfo>
11          <CipherData>
12            <CipherValue>CI/VgARz2Wm/
                GI4YjPVfjjE2WbadJdllAUk/OyRd6xgoCBd4T
                BOJhGEk7Kx41IhR9Jjbvcf5W48+q/
                YkrTKnkiwZuHaqImdhqN
                XLKrqUNRlv0SdxTc9BhRM210k0GVuLhS7OA+
                dmAm16HQbl4n3
                X+Cz4nwdxK0Bxl9I514Qlbc=
13            </CipherValue>
14          </CipherData>
15        </EncryptedKey>
16      </KeyInfo>
17      <CipherData>
18        <CipherValue>CUP8R4g3jRuA+
npr8MMnH3qEJhEIVSe85r1QhzMtPpg=</CipherValue>
19      </CipherData>
20    </EncryptedData>
21  </AccountNumber>
```

In the text shown above, the self-describing data structure 2000 contains an asymmetric key encrypted symmetric key 2010 in the first <CipherData> element shown in lines 11-14 of the text. Additionally, this embodiment of the self-describing data structure 2000 contains asymmetric key encrypted sensitive customer data 2020 in the second <CipherData> element shown in lines 17-19 of the text. As will be apparent to those skilled in the art, the self-describing data structure 2000 is not required to contain any particular XML elements, nor is it required to be an XML document. It must simply have enough information to accurately describe itself, the information it contains, and the decryption algorithms and keys that must be used to decrypt the information it contains.

FIG. 6 provides a diagrammatic representation of one embodiment of the flow of data from the self-describing data structure 2000 to the database 36, which is blind to the sensitive customer data 1020. In one embodiment, the symmetric key encoded sensitive customer data 2020 and the asymmetric key encrypted symmetric key 2010 are stored in a common table 120 of the database 36. This table 120 may be one of the database tables 90 described above with reference to FIG. 3, or it may be a table expressly allocated for storage of sensitive customer data. In one embodiment of the present invention, where the self-describing data structure 2000 is an XML document, the entire XML document is stored in its own field 160 of the table 120. In an alternate embodiment, the symmetric key encrypted sensitive customer data 2020 is stored in one field 160 of the table 120, while the asymmetric key encrypted symmetric key 2010 is stored in another field 170 of the table 120. In one exemplary embodiment the table 120 where the symmetric key encrypted sensitive customer data 2020 is stored contains several fields including one field 160 where the symmetric key encrypted sensitive customer data is stored 2020, one field 170 where the asymmetric key encrypted symmetric key 2010 is stored and other fields, 180, 190 where additional information used by the system 1000 is stored.

FIG. 7 provides a diagrammatic representation of one embodiment of the flow of data from the self-describing data structure 2000 to the database 36, which is blind to the sensitive customer data 1020. In one embodiment, the symmetric key encrypted sensitive customer data 2020 and the asymmetric key encrypted symmetric key 2010 are stored in the different tables 120, 140 of a database 36. These tables 120, 140 may both be one of the database tables 90 described above with reference to FIG. 3, or one or both of them may be tables not previously described. In one embodiment of the present invention, where the self-describing data structure 2000 is an XML document, XML elements representing the symmetric key encrypted sensitive customer data 2020 and the asymmetric key encrypted symmetric key 2010 are stored in separate tables 120, 140 of the database. The tables 120, 140 may be linked to one another in a manner that represents the relationship between the symmetric key encrypted sensitive customer data 2020 and the asymmetric key encrypted symmetric key 2010 that encrypted it (2020).

FIG. 8 provides a diagrammatic representation of one embodiment of the flow of data from the database 36, which is blind to the sensitive customer data 1020 to the applications 30, 32 that require the un-encrypted sensitive customer data 1020. The asymmetric encrypted key 2010 and the encrypted sensitive customer data 2020 are received at the decryption module 900. A second asymmetric key 1065 associated with the asymmetric key 1060 used by the asymmetric key encryptor 1030 is also received by the decryption module 900. In one embodiment, the second asymmetric key 1065 is a private key held in a protected device such as a keystore 1050. The decryption module 900 utilizes the second asymmetric key 1065 and algorithms well-known in the art to decrypt the encrypted symmetric key 2010 into the symmetric key 1010.

The decryption module 900 then decrypts the symmetric key encrypted sensitive customer data 2020 with the symmetric key 1010. The recently unencrypted sensitive customer data 1020 is received by applications 30, 32 that require unencrypted sensitive customer data to perform their functions. In one embodiment of the system, the applications 30, 32 include credit card billing applications, direct debit billing applications, and reporting applications.

FIG. 9 provides a flow chart view of one embodiment of the method to securely store customer data in a network-based commerce system. At a first operation 600, sensitive customer data 1020 is received via a network connection 14 through an application interface 1100. At a second operation 610, a symmetric key 1010 is generated. At the next operation 620, the sensitive customer data 1020 is encoded with the symmetric key 1010 to generate encoded sensitive customer data 2020. At the next operation 630, the symmetric key 1010 is encoded with an asymmetric key 1060 in order to generate an encoded symmetric key 2010. At the next operation 640, the encoded sensitive customer data 2020 and the encoded symmetric key 2010 are placed in a self-describing data structure 2000. At the next operation 650, the encoded sensitive customer data 2020 and the encoded symmetric key 2010 are stored in a database 36.

FIG. 10 shows a diagrammatic representation of machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU) a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320.

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to securely store customer data in a network-based commerce system have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system for securely storing sensitive customer data such that encryption keys are not exposed to the system, including:
   a sensitive customer data application having an application interface to accept the sensitive customer data, and connected to a symmetric key generator to generate a symmetric key;
   a data encryptor to encrypt the sensitive customer data with the symmetric key to form encrypted sensitive customer data;
   a key encryptor to encrypt the symmetric key with a public key to form an encrypted symmetric key; and
   a secure container module to store the encrypted sensitive customer data and the encrypted symmetric key in a self-describing data structure.

2. The system of claim 1, further including a keystore for storing the public key.

3. The system of claim 1, further including a database for storing the encrypted sensitive customer data and the encrypted symmetric key.

4. The system of claim 1, wherein the self-describing data structure is an XML document.

5. The system of claim 4, further including a database for storing the XML document.

6. The system of claim 5, wherein the XML document is stored in an indexed field in a database table.

7. A system for securely storing sensitive customer data such that encryption keys are not exposed to the system, including:
   means for receiving sensitive customer data from the client;
   means for generating a symmetric key;
   means for encrypting the sensitive customer data with the symmetric key to form encrypted sensitive customer data;

means for encrypting the symmetric key with a public key to form an encrypted symmetric key; and means for storing the encrypted sensitive customer data and the encrypted symmetric key in a self-describing container.

8. The system of claim 7 further including means for storing the self-describing container in a database.

9. The system of claim 7 further including means for storing the encrypted symmetric key and the encrypted sensitive customer data in a database.

10. A computer readable medium comprising instructions, which when executed on a processor, cause the processor to perform a method comprising:

receiving sensitive customer data via a network connection through an application interface;

generating a symmetric key;

encoding the sensitive customer data with the symmetric key to generate encoded sensitive customer data;

encoding the symmetric key with an asymmetric key to generate an encoded symmetric key;

placing the encoded sensitive customer data and the encoded symmetric key in a self-describing data-structure; and storing the encoded sensitive customer data and the encoded symmetric key in a database.

11. A method for securely storing sensitive customer data in a network-based commerce system such that encryption keys are not exposed to the system, the method including:

receiving sensitive customer data via a network connection through an application interface;

generating a symmetric key;

encoding the sensitive customer data with the symmetric key to generate encoded sensitive customer data;

encoding the symmetric key with an asymmetric key to generate an encoded symmetric key;

placing the encoded sensitive customer data and the encoded symmetric key in a self-describing data-structure; and storing the encoded sensitive customer data and the encoded symmetric key in a database.

12. The method of claim 11, including obtaining the asymmetric key from a keystore.

13. The method of claim 11, wherein the application interface is a payment application interface.

14. The method of claim 11, wherein the sensitive customer data received through the application interface includes a national identification.

15. The method of claim 11, wherein the sensitive customer data received through the application interface includes billing information.

16. The method of claim 11, wherein the sensitive customer data received through the application interface includes direct debit information.

17. The method of claim 11, wherein the sensitive customer data includes credit card information.

18. The method of claim 11, wherein the network connection is an HTTPS connection.

19. The method of claim 11, wherein the encoded sensitive customer data and the encoded symmetric key are stored in separate fields of a single table in the database.

20. The method of claim 11, wherein the encoded sensitive customer data and the encoded symmetric key are stored in separate tables in the database.

21. The method of claim 11, wherein the encoded sensitive customer data is stored in a database as an XML element.

22. The method of claim 11, wherein the encoded symmetric key is stored in a database as an XML element.

23. The method of claim 11, wherein the encoded sensitive customer data is stored in an indexed field in a database table.

24. The method of claim 11, wherein the self-describing data structure is an XML document.

25. The method of claim 24, wherein the XML document is stored in a database.

26. The method of claim 24, wherein the XML document is stored in an indexed field of a database table.

* * * * *